(No Model.) 5 Sheets—Sheet 1.

J. KAYSER.
SEWING MACHINE.

No. 377,830. Patented Feb. 14, 1888.

Attest:
W. E. Poulter
G. Fischer

Inventor:
John Kayser,
by
his atty.

(No Model.) 5 Sheets—Sheet 2.

J. KAYSER.
SEWING MACHINE.

No. 377,830. Patented Feb. 14, 1888.

Attest:
W. E. Poulter.
F. Fischer.

Inventor:
John Kayser.
by Henry M.
his atty (No Model.) 5 Sheets—Sheet 3.
J. KAYSER.
SEWING MACHINE.
No. 377,830. Patented Feb. 14, 1888.
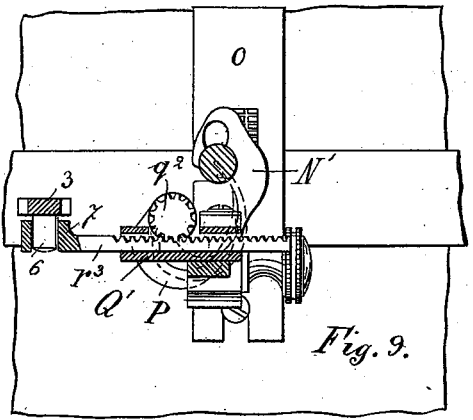
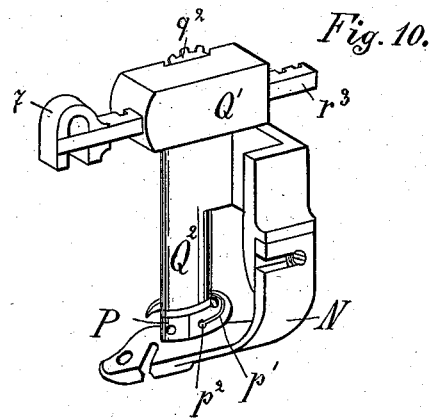
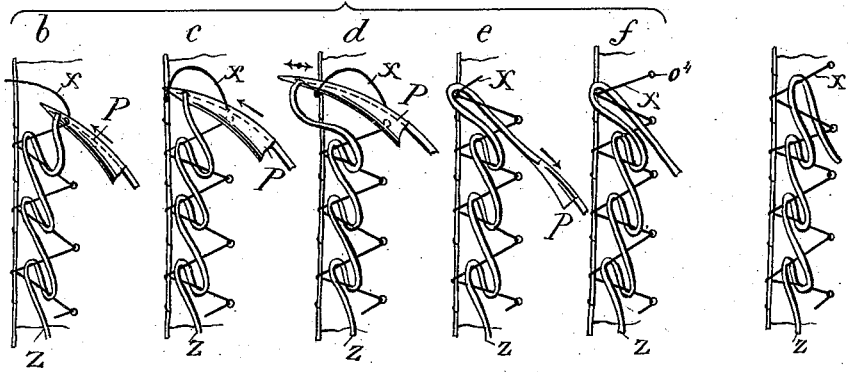
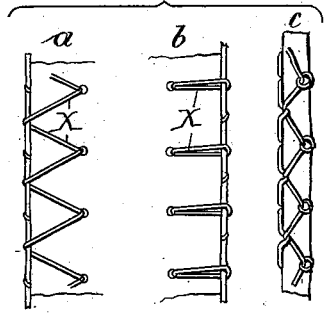
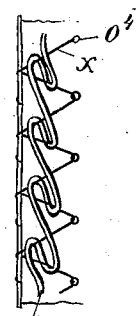
Attest:
W. S. Coulter
F. Fischer
Inventor:
John Kayser,
per Henry Will
his atty.

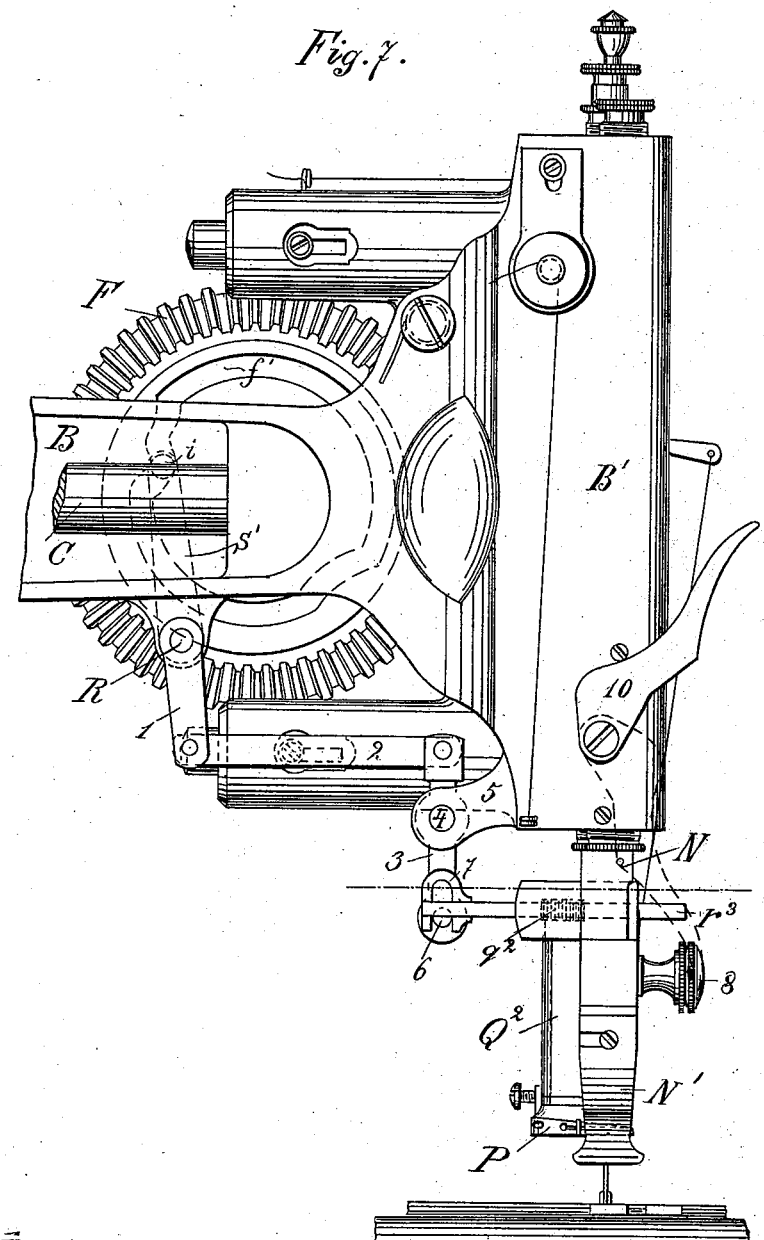

(No Model.) 5 Sheets—Sheet 5.

J. KAYSER.
SEWING MACHINE.

No. 377,830. Patented Feb. 14, 1888.

UNITED STATES PATENT OFFICE.

JOHN KAYSER, OF KAISERSLAUTERN, BAVARIA, GERMANY.

SEWING-MACHINE.

SPECIFICATION forming part of Letters Patent No. 377,830, dated February 14, 1888.

Application filed March 23, 1887. Serial No. 232,164. (No model.) Patented in England January 18, 1886, No. 756; in Germany January 19, 1886, No. 37,403, and December 23, 1886, No. 40,136, and in Austria-Hungary July 9, 1886, No. 3,138 and No. 32,384.

*To all whom it may concern:*

Be it known that I, JOHN KAYSER, a subject of the King of Bavaria, residing at Kaiserslautern, Bavaria, German Empire, have invented certain new and useful Improvements in Sewing-Machines, (for which I have patents in Germany, Nos. 37,403 and 40,136, dated January 19, 1886, and December 23, 1886, respectively; in Austria-Hungary, Nos. 3,138 and 32,384, dated July 9, 1886, and in England, No. 756, dated January 18, 1886;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
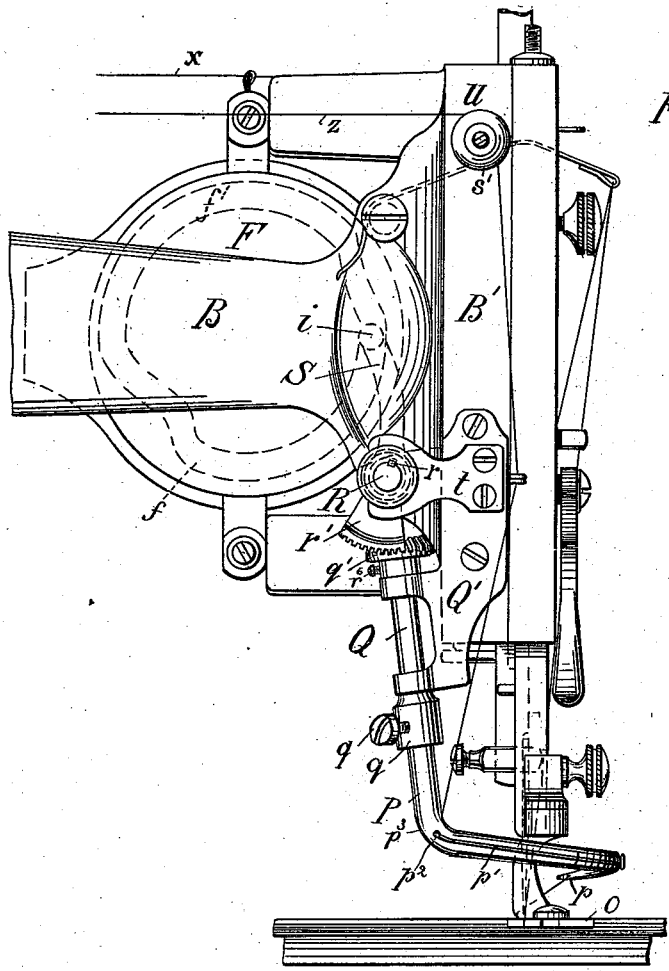
Figure 3:
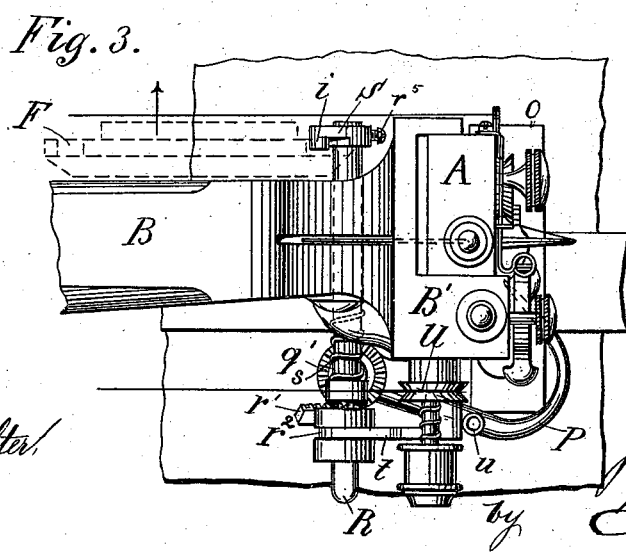
Figure 2:
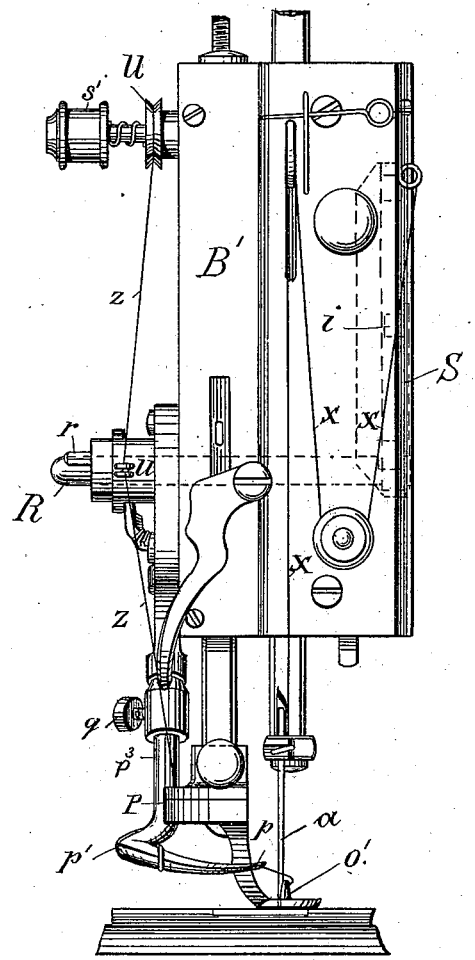
Figure 4:
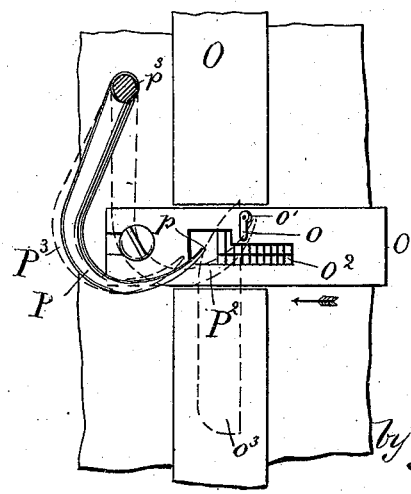
Figure 8:
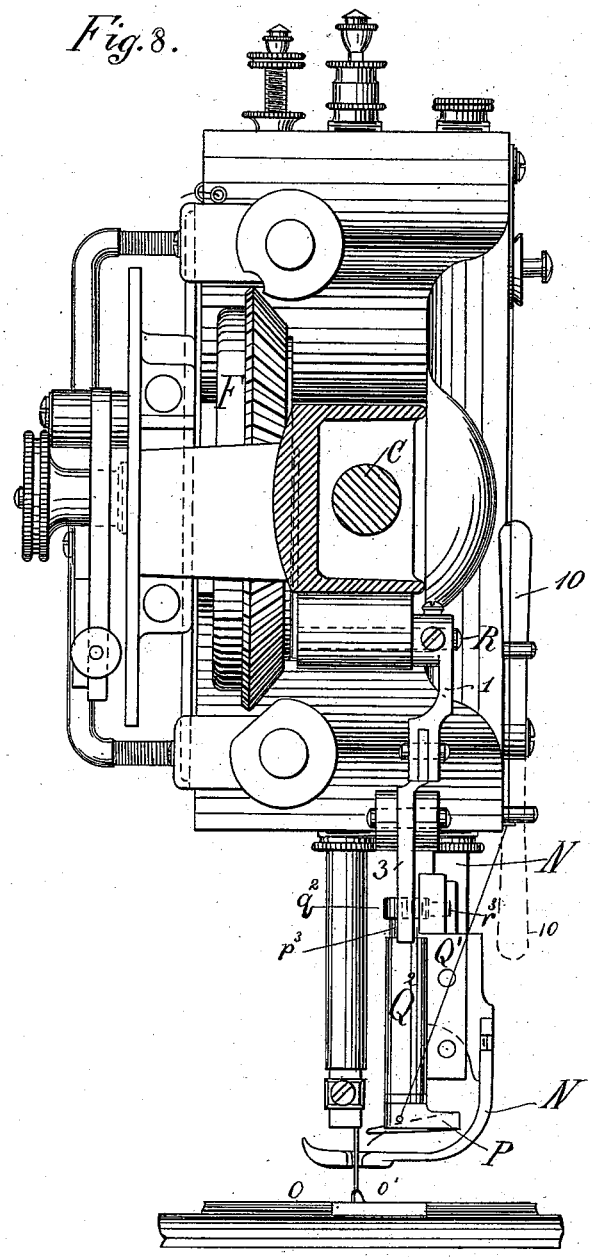

Referring to the drawings, Figure 1 is a rear elevation of so much of a sewing-machine as is necessary to illustrate my invention. Fig. 2 is a right end elevation, and Fig. 3 a top plan view, thereof. Fig. 4 is a top plan view of a portion of the work-plate, showing the various positions of the hook for introducing the fancy thread into the zigzag stitch. Fig. 5 shows the zigzag stitch without the fancy thread, and Figs. 6 to $6^g$ illustrate the manner in which the fancy thread is introduced into the zigzag stitch. Fig. 7 is a rear elevation, and Fig. 8 a left end elevation, partly in section, of the head of the overhanging arm of the machine, showing a modified construction of the devices for introducing the fancy thread. Fig. 9 is a detail view, and Fig. 10 an isometric view, of the detachable portion of the devices for introducing the fancy thread.

This invention relates to that class of sewing-machines in which the needle-bar is reciprocated both vertically and horizontally to produce a zigzag stitch, and has for its object to provide means for the introduction into the stitch of a fancy thread, such as a heavier thread of colored silk, for instance.

The invention consists in the construction and combination of mechanical devices with a sewing-machine of the class referred to, whereby the object of this invention is attained substantially as hereinafter fully described, and as set forth in the claims.

The devices that form the subject-matter of my invention are applicable to any machine constructed to form a zigzag stitch, suitable means being provided for operating the said devices from a driving or moving element of the machine.

In the drawings, I have shown my improvements applied to a machine embodying the principles of construction described and shown in Letters Patent of the United States granted to me under date of February 24, 1885, No. 312,862, and June 1, 1886, No. 343,036.

In the drawings, F indicates the cone-wheel that is driven from a pinion on the shaft C in the overhanging arm B, Fig. 7, and by means of which wheel and the mechanism described in the Letters Patent referred to, and more especially in Letters Patent No. 343,036, the needle-bar casing A is reciprocated horizontally in the head B' of said overhanging arm to produce the zigzag stitch. As described in said Letters Patent, the wheel F has a cam-groove, by means of which and suitable transmitting devices the said needle-bar casing is reciprocated horizontally. In the construction now under consideration the wheel F has in its opposite face another cam-groove, $f'$, of the form shown in Figs. 1 and 7, in which rides a stud, $i$, that carries a friction-roller and that projects from a radial arm or lever, S, secured to a cross-shaft, R, in rear of head B', in which it has its bearings. The radial arm or lever S is preferably made detachable from the shaft R, and is secured at one end thereof by means of a screw, $r^5$, Fig. 3. On the opposite end of the shaft R is loosely mounted a toothed sector, $r'$, which sector is held against independent oscillation on the rock-shaft R by means of a spline or feather, $r$, and by means of a spring, $s$, Fig. 3, that serves to return the shaft to its normal position when moved out of it with the wheel F.

As described in the Letters Patent above referred to, the wheel F has a longitudinal motion on or with its shaft to permit of its being thrown out of gear with the driving-pinion.

In order that the rock-shaft R may follow such longitudinal motion without displacing the sector $r'$, I connect the latter with the shaft by means of a spline or feather, $r$, so that the shaft will have a free endwise motion in the bearing-sleeve of the sector.

To prevent the sector partaking of the endwise movements of the shaft, I form a peripheral groove in said bearing-sleeve, in which project the forked arms of a lock-plate, $t$, secured to a bracket, $Q'$, Fig. 1, which bracket is detachably secured to the head $B'$ on the overhanging arm B of the machine. The bracket $Q'$ has bearings for a shaft, Q, at whose upper end is secured a bevel-pinion, $q'$, that is in gear with the sector $r'$. At its lower end the shaft Q has a socket, $q^2$, in which fits the shank of the oscillating hook P, that serves to introduce the fancy thread into the zigzag stitch.

It will readily be comprehended that as the wheel F is rotated the rock-shaft R is oscillated through the medium of the lever S, that said oscillation is varied according to the irregularities in the cam-groove $f'$ of said wheel, F, and that the oscillations of shaft R are transmitted to the shaft Q through the sector $r'$ and pinion $q'$, and through said shaft Q to the hook P. The hook P is secured to shaft Q by means of a screw, $q$, and its general form is substantially that shown, the outer end thereof having more or less the form of a sickle, so as to enable it to move in front of and around the needle $a$. At its point the hook has an eye, $p$, and in its back a thread-groove, $p'$, that extends from said eye $p$ to or nearly to the shank $p^3$ of the hook and terminates in another thread-eye, $p^2$. The fancy thread is wound upon a suitable spool, $s'$, and passes thence between thread-tension disks U to a curl or thread guide, $u$, Figs. 1 and 2, and thence to the eye $p^2$, groove $p'$, and eye $p$ of the hook P.

The needle plate or slide O, in view of the horizontal movement of the needle, is provided with an elongated needle-hole, $o$, at the right end of which is arranged the semi-cylindrical well-known guide-stud $o'$ for guiding the edge of the material.

In its vertical and horizontal reciprocations the needle $a$ passes alternately through the needle-hole at opposite ends, during which time the feed-dog $o^2$ feeds the fabric the distance of a stitch forward in the direction of the arrow, Fig. 4, and the shuttle $o^3$ (shown in dotted lines in said figure) makes a complete reciprocation. The stitch resulting from this operation is shown in Fig. 5, and on the right side of the material said stitch is an irregular one or zigzag form, as shown at $a$, while on the under side of the fabric the upper thread lies at right angles to the edge of the material, as shown at $b$, while the corresponding under or shuttle thread forms an undulating line that connects the loops of the needle-thread along the edge of the material, as shown at $c$ in said Fig. 5.

When the fancy thread is introduced by means of the hook P, a stitch, such as shown in Figs. 6 to $6^s$, is obtained, and this stitch is formed as follows, referring to said Figs. 6 to $6^s$: Let it be assumed that the needle $a$ has reached the limit of its upward movement, the hook P will then be in the position shown at $b$, Fig. 6. As the needle $a$ moves downward to enter the needle-hole $o$ by the side of the guide $a'$ or at the right end of the needle-hole and close along the edge of the material, the hook P, whose thread $z$ is held by the preceding stitch or by hand, moves toward the needle, as shown at $c$ Fig. 6, then in front thereof and close thereto, so that the needle-thread $x$ will lie on said hook, as shown at $d$, Fig. 6, and in dotted lines at $P^2$, Fig. 4. Simultaneously with this movement of the hook P the needle-point passes through the loop formed by the fancy thread $z$, and then through the needle-plate, while the hook moves rapidly back into the position shown in full lines in Fig. 4, and at $e$, Fig. 6. The loop of the fancy thread will therefore be held by the needle until the latter moves out of the needle-plate and then down again and through the material at $o^4$ to complete the stitch, as shown at $f$, Fig. 6. Simultaneously with the downward and lateral motion of the needle $a$ to the material at $o^4$, and before said needle penetrates into the material, the hook will complete its backward movement and assume the position shown in dotted lines at $P^3$, Fig. 4, thereby drawing the loose loop of fancy thread $z$ tight, as shown in Fig. $6^s$, the said thread being secured by the needle-thread $x$ as soon as the needle-point $a$ has passed through the material. The described operation is repeated, the needle in its next downward movement passing along the edge of the material and the hook P toward said needle to lie in the fancy thread, &c. The needle-thread $x$ passes from its spool to the needle in the usual and well-known manner in this class of machines, and needs, therefore, no detailed description. When it is desired not to use the hook P, it may be removed from the shaft Q, or the shaft may be pushed endwise to disengage the stud $i$ on the lever S from the cam-groove $f'$ of the wheel F. When the fancy thread is to be inserted, the needle-plate O, provided with the guide-stud $O'$, is removed and a needle-plate of similar construction, but devoid of a guide-stud, is substituted.

The mechanism for oscillating the hook P may be varied and the said mechanism or a portion thereof, and the hook may be constructed so as to be detached from the machine, as shown in Figs. 7 to 10, inclusive. In this construction the shaft R has a second radial arm, 1, in lieu of the sector $r'$, to which is pivoted one end of a connecting-rod, 2, whose other end is pivoted to one end of a lever, 3, fulcrumed at 4 in a bracket, 5, projecting from the head $B'$ on the overhanging arm B. At its lower end the lever 3 is provided with a stud or pin, 6, that projects into a forked bearing, 7, at one end of a toothed or rack bar, $r^3$.

It is obvious that in the construction described the rotary motion of the wheel F will be converted into a rocking or oscillating motion through the medium of the lever S, stud $i$, and cam-groove $f'$ to rock the shaft R, and through the arm 1, connecting-rod 2, and lever 3 to reciprocate the rack-bar $r^3$ to oscillate the hook P, as follows: In the head of a frame, Q, detachably connected with the presser-bar N by means of a thumb-screw, 8, is arranged the rack-bar, $r^3$, that meshes with a pinion, $q^2$, secured to the upper end of the shank $p^3$ of the hook P, which shank has its bearings in a tubular extension, $Q^2$, depending from the said head of frame $Q'$.

The oscillations of the hook P are timed to the reciprocations of the needle, so that the said hook notwithstanding its motion remains in proximity to the needle-hole in the needle-plate, whereby the clamping of the needle-thread is avoided. When the presser-foot is lifted off the material by means of the lever 10, which to this end is moved from the position shown in dotted lines, Fig. 8, to that shown in full lines in said figure, the connection between the rack-bar $r^3$ and the stud 6 on the lever 3 is not interrupted, the fork 7 being of sufficient length to prevent this, as shown in Fig. 7, so that the said rack-bar and lever will under all circumstances be coupled together.

If it is desired to remove the hook P, the thumb-screw 8 is loosened and the bracket $Q'$ slipped off the presser-bar N after lifting the fork 7 on the rack-bar $r^3$ off the stud 6.

The rock-shaft R may also be arranged relatively to the wheel F and rack-bar $r^3$, so that a radial arm on said shaft will directly operate the rack-bar, instead of immediately through the connections described.

What I claim is—

1. In a sewing-machine, the combination, substantially as described, of the following elements: a vertically and horizontally reciprocating needle, a presser-bar operated as usual, and a hook having an oscillating motion above the work-plate of the machine and co-operating with the needle to introduce an additional thread, $z$, into the zigzag stitch formed by said needle, as shown.

2. In a sewing-machine, the combination, substantially as described, of the following elements: a horizontally and vertically reciprocating needle, a presser-bar operated as usual, a hook having an oscillating motion above the work-plate of the machine, around said needle, and co-operating therewith to introduce an additional thread, $z$, into the zigzag stitch formed thereby, as shown, and a connection between said hook and the presser-bar, for the purpose specified.

3. In a sewing-machine, the combination, with a horizontally and vertically reciprocating needle to produce a zigzag stitch, and a wheel, F, operated from a driving part of the machine and provided with a cam-groove, of a hook, P, for introducing an additional thread into the zigzag stitch, a lever operated by the cam-groove of the wheel F, and a connection between the lever and hook to vibrate the latter, substantially as and for the purpose specified.

4. In a sewing-machine of the class described, the combination, with the zigzag stitch-forming devices, the wheel F, provided with a cam-groove, $f'$, and the hook P, of the rock-shaft R, the lever S, provided with a stud that rides in said cam-groove, and whereby said rock-shaft and lever are oscillated, and transmitting mechanism to transmit the oscillatory motion of the shaft to said hook P, substantially as and for the purpose specified.

5. In a sewing-machine of the class described, the combination, with the zigzag stitch-forming devices, the endwise-movable wheel F, provided with a cam-groove, $f'$, and the hook P, of the endwise-movable rock-shaft R, the lever S, provided with a stud that rides in said cam-groove, and whereby said rock-shaft and lever are oscillated, and transmitting mechanism to transmit the oscillatory motion of the shaft to said hook P, substantially as and for the purpose specified.

6. In a sewing-machine of the class described, the combination, with the zigzag stitch-forming devices, the wheel F, provided with a cam-groove, $f'$, and the hook P, of the endwise-movable rock-shaft R, a spring to return said shaft into its normal position when moved out of it, the lever S, provided with a stud that rides in said cam-groove, and whereby said rock-shaft and lever are oscillated, and transmitting mechanism to transmit the oscillatory motion of the shaft to said hook P, substantially as and for the purpose specified.

7. The combination, in a sewing-machine of the class described, with the zigzag stitch-forming devices, the presser-bar, the wheel F, for imparting a horizontal reciprocating movement to the needle-bar, provided with a cam-groove, $f'$, the rock-shaft R, provided with a radial arm, S, having a stud, $i$, projecting into cam-groove $f'$, of an attachment for introducing a fancy thread, $z$, into the zigzag stitch, comprising a support connected with the presser-bar and provided with a tubular bearing-sleeve, a hook, P, having its bearings in said sleeve, and connecting and transmitting mechanism for connecting the hook with and oscillating the same from the rock-shaft, substantially as and for the purpose specified.

8. The combination, in a sewing-machine of the class described, with the zigzag stitch-forming devices, the presser-bar, the wheel F, for imparting a horizontal reciprocating movement to the needle-bar, provided with a cam-groove, $f'$, and the rock-shaft R, provided with radial arm, S, having a stud, $i$, projecting into cam-groove $f'$, of an attachment for introducing a fancy thread, $z$, into the zigzag stitch, comprising a support connected with the presser-bar and provided with a tubular bearing-sleeve, a presser-foot connected with said support, a hook, P, having its bearings in said sleeve, and connecting and transmitting mechanism for connecting the hook with and oscillating the same from the rock-shaft, substantially as and for the purpose specified.

9. In a machine of the class described, the combination, with the zigzag stitch-forming devices and the presser-bar, of an attachment for introducing a fancy thread, $z$, into the zigzag stitch, comprising a support connected with the presser-bar, a hook, P, for introducing the said fancy thread, having its bearings in the support, a vibrating lever vibrated by a driving element of the machine, a transmitting device operating to transmit the vibrations of the lever to the hook, and a self-adjusting connection between the vibrating lever and transmitting device operating to maintain the same in connection when the presser-bar is lifted, substantially as and for the purpose specified.

10. The combination, in a sewing-machine of the class described, with the zigzag stitch-forming devices, the presser-bar, the wheel F, for imparting a horizontal reciprocating movement to the needle-bar, provided with a cam-groove, $f'$, the rock-shaft R, provided with a radial arm, S, having a stud, $i$, projecting into cam-groove $f'$, and a radial arm, 1, of an attachment for introducing a fancy thread, $z$, into the zigzag stitch, comprising a support detachably connected with the presser-bar, a hook, P, having its bearings in said support, a pinion on the upper end of the shank of the hook, a rack-bar operating in the head of the support and meshing with said pinion, a vibrating lever connected with the rack-bar, and a connecting-rod connecting said lever with the arm 1 of the rock-shaft, substantially as and for the purpose specified.

11. The combination, with the presser-bar and the vibrating lever 3, vibrated by a driving element of the machine, of the support $Q'$, the hook P, mounted in said support and carrying a pinion, $q^2$, and the rack-bar $r^3$, operating in the head of the support and meshing with the pinion $q^2$, said rack-bar having at one end a forked bearing, 7, for engagement with a stud, 6, on said vibrating lever, substantially as and for the purpose specified.

In testimony whereof I affix my signature in presence of two witnesses.

JOHN KAYSER.

Witnesses:
J. F. MONAGHAN,
CAROLA ROCHLITZ.